J. HUTCHINSON.
FOUR-CYCLE INTERNAL COMBUSTION ENGINE.
APPLICATION FILED OCT. 16, 1917.
1,378,352.
Patented May 17, 1921.
2 SHEETS—SHEET 2.
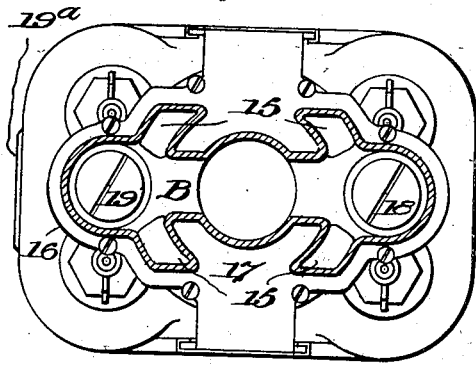
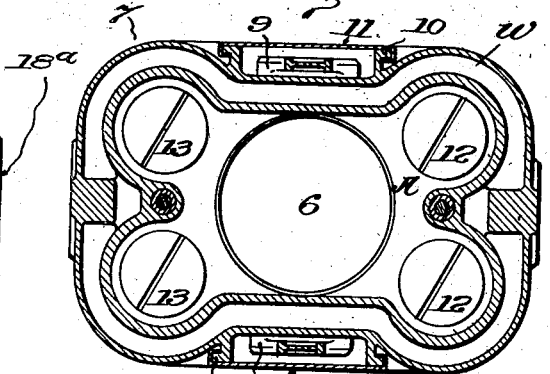
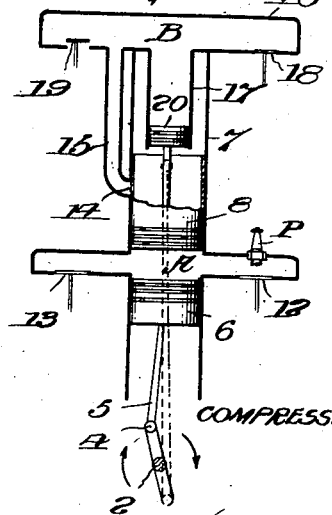
COMPRESSION
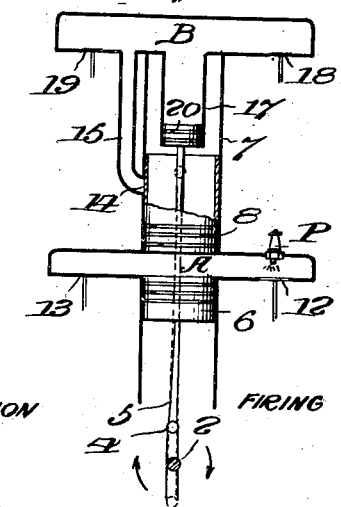
FIRING
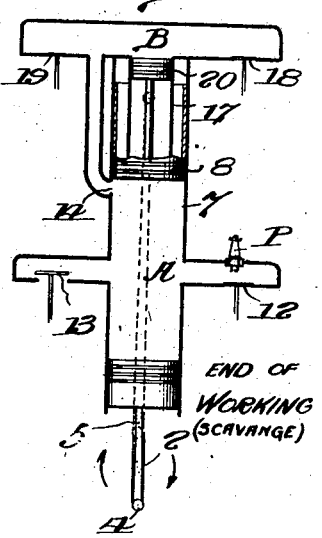
END OF WORKING (SCAVANGE)
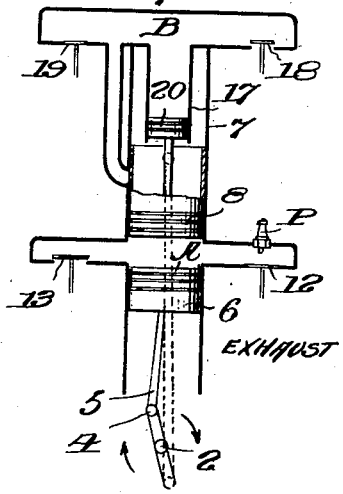
EXHAUST
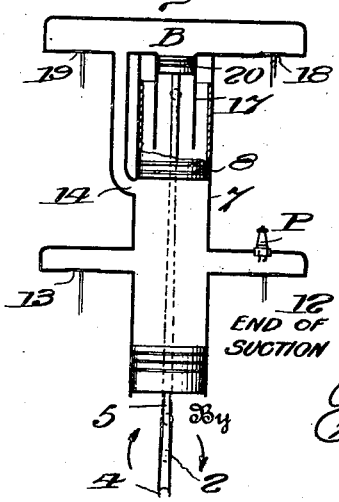
END OF SUCTION
Inventor
Job Hutchinson,
By
Attorney

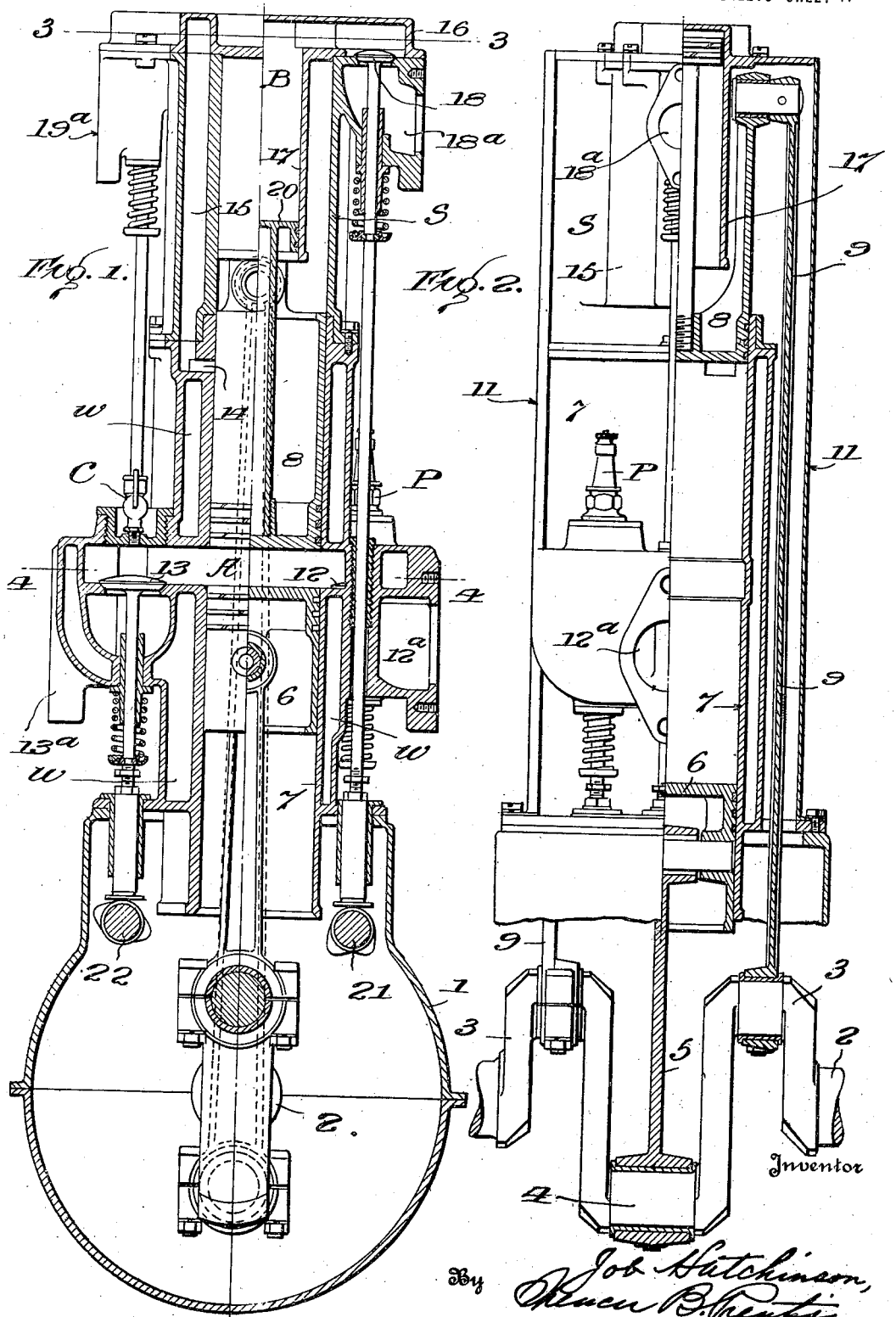

UNITED STATES PATENT OFFICE.

JOB HUTCHINSON, OF BROOKLYN, NEW YORK.

FOUR-CYCLE INTERNAL-COMBUSTION ENGINE.

1,378,352.  Specification of Letters Patent.  Patented May 17, 1921.

Application filed October 16, 1917. Serial No. 196,823.

*To all whom it may concern:*

Be it known that I, JOB HUTCHINSON, a citizen of the United States, residing at Brooklyn, in the county of Kings and State of New York, have invented new and useful Improvements in Four-Cycle Internal-Combustion Engines, of which the following is a specification.

This invention relates to internal combustion engines of the four cycle type, and has particular reference to improvements therein whereby the compression of the live fuel charge is greatly augmented, thus rendering the engine of increased efficiency and especially adaptable for use in high altitudes or similar atmospheric conditions.

Accordingly, the invention has as its general object not only the provision of means for insuring an ample supply of live fuel, but at the same time compressing the latter to a point where it is super-compressed. That is to say, in addition to the volume of live gas drawn into the working cylinder on the suction stroke of the main piston, it is proposed to inject therein at the end of said stroke a supplementary compressed gas charge which fills the cylinder with considerably more fuel than that taken in at atmospheric pressure, thus providing a super-abundance of gaseous fuel, a part of which has been already compressed, and which, upon the compression stroke of the piston, becomes again compressed with the fuel taken in at normal atmosphere, to be thereby super-compressed.

To attain this desirable end the invention contemplates a novel four cycle engine which embodies in its organization a two cycle auxiliary gas and air compressor, that not only performs the advantageous function of supplying an auxiliary or supplemental compressed gas charge, but also provides for injecting a compressed air charge into the cylinder to effect a complete scavenge thereof at the proper point in the cycle. By this combination the horse-power per cylinder is greatly increased without adding weight in proportion, and in fact, according to the standard formula for computing horse-power, a motor embodying these features will develop three times the horse-power per cylinder as that of the ordinary motor with the same bore and stroke, while only consuming two and one half times the amount of gas.

A further object of the invention is to provide a novel arrangement of parts whereby the relative weights thereof are properly distributed to insure an accurately balanced engine structure, thereby eliminating unnecessary vibration and utilizing to the greatest possible extent the maximum energy of the exploded charge. In this connection it is also proposed to provide a cylinder having a novel valve arrangement, and capable of producing sufficient horse-power whereby as much or more power can be obtained from a motor of four cylinders than is now obtained from a motor of twelve, and furthermore which would, after including the number of parts added to the cylinder by the present invention, still reduce the total number of parts about fifty per cent.

With the foregoing and other objects in view which will more fully appear as the description of the invention proceeds, the invention consists in the novel construction, combination and arrangement of pacts hereinafter more fully set forth and claimed.

A practical embodiment of the invention is shown in the accompanying drawings, in which:—

Figure 1 is a vertical sectional view of my improved engine construction.

Fig. 2 is a view taken at right angles to Fig. 1 and partly in section and partly in elevation.

Fig. 3 is a cross section on the line 3—3 of Fig. 1.

Fig. 4 is another cross section on the line 4—4 of Fig. 1.

Fig. 5 is a diagram showing the relative position of parts just before the end of the compression stroke.

Figs. 6 and 7 are views similar to Fig. 5 but respectively showing the end of the compression stroke or firing position, and the end of the working stroke.

Fig. 8 illustrates the position of parts just before the end of the exhaust stroke.

Fig. 9 shows the end of the suction stroke of the main piston.

Similar reference characters designate corresponding parts throughout the several figures of the drawings.

Referring now in detail to the embodiment of the invention shown in the accompanying drawings, it will be seen from Figs. 1 and 2 that the reference numeral 1 designates a conventional crank case, while 2 designates the crank shaft journaled therein and having the oppositely disposed crank portions 3—3 and 4, the latter being connected in the usual manner by the rod 5 with a main piston 6 which reciprocates within the engine cylinder 7. This cylinder is preferably of relatively great length as compared with the length of the stroke of the said main piston 6 for the purpose of accommodating a reciprocatory auxiliary piston 8 which will hereinafter be described more fully, and coöperates with the piston 6 to provide oppositely working abutments each operatively connected with the crank shaft 2 through the single rod 5 in the case of the piston 6 and the duplicate exterior connecting rods 9—9 in the case of the auxiliary piston 8, to thus impart an even and steady power stroke to said crank shaft. As shown in Fig. 2, the exterior connecting rods 9 have their upper ends connected to the opposite sides of the auxiliary piston while their lower ends are connected with the crank portions 3—3 of the shaft, and for the purpose of concealing and housing the same it is proposed to provide the outer sides of the cylinder 7 at opposite points with suitable outturned holding flanges 10 (Fig. 4) for engaging with the properly flanged edge portions of a cover plate or shield 11.

With further reference to the cylinder 7 it may be noted that the body of the same is provided with the water jacket W, and the intermediate portion of this body is formed with a transverse firing chamber A whose height represents the respective advancing limits of each stroke of the opposed abutments while its width is sufficient to accommodate oppositely located sets of fuel intake and exhaust valves respectively designated as 12—12 and 13—13 which alternately operate to place the chamber A in communication with a source of fuel supply through the connection 12ª and with the atmosphere through a similar connection 13ª. Above the chamber A, at a distance equal to the full length of the stroke of the auxiliary piston 8, the inner wall of the cylinder is formed with a plurality of inlet ports or orifices 14 which form the mouth of suitable conducting passages 15. These passages are formed in a section S of the cylinder that is removable from the body portion, which is water-jacketed as previously referred to, for the purpose of facilitating the casting of the cylinder and also its assembly, but when this section is fitted in place it forms in effect an integral cylinder structure, and, as shown, the portion of the cylinder just described has fitted thereto a detachable head or cap designated in its entirety by the reference 16.

The said head 16 is of hollow formation and has at the central portion of its lower face a depending casing or barrel 17 which with the formation mentioned, provides a substantially T-shaped compression chamber B the wings of which cover and house at opposite ends thereof an auxiliary fuel intake valve 18 and air intake valve 19 which have their seats formed in the section S of the cylinder and are operated by positive means, as will presently appear, to alternately put the chamber B in communication with the source of fuel supply through the inlet connection 18ª and the atmosphere through the port 19ª. The casing 17 of the head projects down into the bore of the cylinder a considerable distance and receives therein a compressor head or plunger 20 carried by the rear side of the auxiliary piston 8 whereby when the said piston reciprocates the plunger will do likewise, and thus have the effect of either drawing in fuel or air, or compressing and expelling same according to the position of the valves 18 and 19 and also the piston 8, which latter is of sufficient length to keep the port 14 in the cylinder closed at all times except at the end of the working and suction strokes of the main piston 6.

All of the valves 12—12, 13—13, and 18 and 19 are of the conventional puppet type but their novel arrangement in the present structure renders them especially advantageous both from the standpoint of operation and total efficiency of the engine. As will be seen from Figs. 1, 3 and 4 the auxiliary fuel intake valve 18 and the air intake valve 19 have relatively long stems which are guided in the cylinder body at points between the paired sets of intake and exhaust valves, whereby their lower ends may be operated by the same cam shafts 21 and 22 which operate the valves last referred to. Of course different cams with different relative settings are used for the different valves, but this arrangement has the advantage of operating all of the valves by two cam shafts which may be conveniently located with respect to the crank shaft and at the same time insure the accurate operation and proper synchronism of all of the valves.

From the foregoing it will be apparent that a novel engine structure is provided whereby the general objects set forth at the beginning of the specification may be effectively carried out, and before proceeding to a description of the operation of the various instrumentalities it may be noted that the arrangement of the valves 12—12 and 13—13 at opposite sides of the cylinder, and beyond the lines thereof provides for conveniently locating the spark plugs P in the housing above the intake valves 12 while the priming cups C may be readily fitted in place over the exhaust valves 13.

For the purpose of following the operation of the present motor, reference will be made to the diagrammatic illustrations namely, Figs. 5 to 9 inclusive, wherein the progression of the cycle of both the main piston 6 and auxiliary piston 8 may be readily followed. The first of these diagrams, Fig. 5, shows the relative position of parts just before the end of the compression stroke of the piston 6, and is also illustrative of the position of valves maintained throughout the said compression stroke. That is to, say, during the compression stroke, all of the valves 12—12, 13—13 and 18 are closed but the air intake valve 19 is held open by the proper cam on the cam shaft 22 so that as the auxiliary piston 8 advances toward the main piston 6 the plunger 20 carried by the former will suck a volume of air in the chamber B of the head 16, and this intake of air is not stopped until the end of the compression stroke as illustrated by Fig. 6, when the valve 19 closes. Then all of the valves 12—12, 13—13, 18 and 19 remain closed while the spark plugs P ignite the compressed fuel charge to cause the pistons 6 and 8 to recede or separate and give the working stroke, the end of which is indicated by Fig. 7.

The delivery capacity of compression chamber B by the action of plunger 20 is about equal to firing chamber A, that is, the volume in cylinder 7 between pistons 6 and 8 at the end of their inward stroke, so that the amount of air admitted from the compression chamber to cylinder 7 between pistons 6 and 8 on the up-stroke of the latter is bound to be sufficient to displace the burned gases at the end of the exhaust stroke. And as the work pistons 6 and 8 only draw in four-fifths of the normal volume of cylinder 7, the compressor plunger 20 associated with the auxiliary 8 supplies the other one-fifth of fresh air and gas, and tends to keep the charge above atmospheric pressure instead of dropping below that point, as all other motors do at high speed.

With further reference to the operation of the device it will now be seen that since the chamber B has been filled with air on the down stroke of the piston 8, this air will be compressed on the working stroke because the plunger 20 rises in the casing 17, and as soon as the piston 8 reaches the limit of its up stroke its lower edge uncovers the port or orifice 14 thus releasing the compressed air into the working cylinder simultaneously or substantially so, with the opening of the exhaust valves 13 to assist in the scavenge of the cylinder.

Then as the pistons leave the end of the working stroke and commence the exhaust stroke to completely expel all of the dead gases, the cam shaft 21 causes the auxiliary fuel valve 18 to lift as shown in Fig. 8. Although this latter figure shows the relative position of parts just before the end of the exhaust stroke, it will be understood that the auxiliary fuel valve 18 opens the instant the piston 8 starts its down stroke to thus cause the receding plunger 20 to draw live fuel into the chamber B. During this intake of live fuel into the said chamber the air valve 19, of course, remains closed but the exhaust valves 13 are open.

When the end of the exhaust stroke is reached, the suction stroke of the main piston 6 begins to draw live fuel into the working cylinder at atmospheric pressure through the opened intake valves 12, and simultaneously with this intake or suction of live fuel through these ports, the fuel charge in the chamber B is compressed by the upstroke of the piston 8 which carries with it the plunger 20. As the lower edge of the said piston 8 passes the orifice 14 at the end of the suction stroke the compressed supplemental fuel charge is injected into the main fuel charge to thus augment and increase the same prior to the stroke compression for firing. When the supplemental fuel charge is injected into the working cylinder the valves 12 are, of course, closed to prevent loss of compression, and in connection with this additional charge it may be noted that as the regular suction strokes of the working pistons only draw in about four-fifths of the working cylinders' capacity, the supplemental charge more than makes up for this loss of fuel, since as previously stated the delivery capacity of the chamber B by the action of plunger 20 is about equal to the capacity of the firing chamber A. Thus, with the present construction the live fuel charge is always kept above atmospheric presure and will not drop below as is the case in other motors when running at high speed. Furthermore, the entrance or injection of additional gas under pressure into the original fuel charge greatly increases the mean effective pressure throughout the expansion or power stroke.

Without further description it is thought that the many features and advantages of the present construction will be readily apparent, and it will of course be understood that minor changes in the form, proportion, and details of construction may be resorted to without departing from the spirit of the invention or scope of the appended claims.

I claim:—

1. A four cycle internal combustion engine including a cylinder having a compressor chamber at one end adapted to alternately communicate with a source of fuel supply and the atmosphere and a port in communication with said chamber, and oppositely working pistons within said cylinder, one of said pistons being adapted to alternately compress the gas and air contents of said chamber and uncover said port to release such compressed charge into the working chamber.

2. A four cycle internal combustion engine including a cylinder having primary intake and exhaust ports and an auxiliary port, a compressor casing in valved communication with the atmosphere and source of fuel supply and in direct communication with said auxiliary port, a main piston, and an auxiliary piston working in opposition to the main piston and coöperating with the compressor casing for alternately compressing air and a supplemental gas charge therein and acting as a valve for said auxiliary port to admit the scavenging air charge at the end of the working stroke and the supplemental gas charge into the main charge at the end of the suction stroke.

3. A four cycle internal combustion engine including a working cylinder formed with a valved compressor casing, a main piston within said working cylinder, and an auxiliary piston coöperating with the compressor casing to alternately inject a compressed supplemental fuel charge and a compressed scavenging air charge into the working cylinder respectively at the end of the main fuel suction and exhaust strokes of said main piston.

4. A four cycle internal combuston engine including a cylinder having a head and oppositely working pistons, one of which pistons on the suction stroke of the cycle simultaneously compresses a gaseous auxiliary fuel charge within the head of the cylinder, and means for releasing said compressed fuel charge into the main fuel charge at the end of the suction stroke.

5. A four cycle internal combustion engine including a main piston and a two-cycle air and gas compressor device arranged in the upper part of the engine cylinder and adapted to alternately inject a supplemental compressed fuel charge and a scavenging air charge into the working cylinder respectively at the end of the main fuel suction and working strokes.

6. A four cycle internal combustion engine including a cylinder and a crank shaft, a main piston operating within the cylinder and having a working stroke at the end of each two revolutions of the crank shaft, and an auxiliary piston also located in the cylinder and working in opposition to the main piston, said auxiliary piston displacing gas and air respectively into the space between said two pistons at the end of each alternate revolution of the crank shaft.

7. A four cycle internal combustion engine including a crank shaft, a main piston operating within the cylinder and having a working stroke at the end of each two revolutions of the crank shaft, a combined air scavenge and fuel compressor unit formed at the top of the cylinder and including a member having a chamber provided with valved intake and exhaust ports and also adapted to communicate with the working cylinder, and a piston working in opposition to the main piston and adapted at the end of each revolution of the crank shaft to displace either air or gas from the chamber into the working cylinder by uncovering the outlet from said chamber to the working cylinder.

8. A four cycle internal combustion engine including a cylinder having intake and exhaust ports and a gas orifice, cam actuated valves for controlling said intake and exhaust ports, a chambered cylinder head in communication with said orifice a main piston, and another piston working in opposition thereto and adapted to uncover the said orifice on reaching the limit of its travel toward the end of the cylinder on the working and suction strokes to displace the contents of the cylinder head through said orifice.

9. An internal combustion engine including a cylinder, a pair of oppositely working abutments therein, a hollow cylinder head element including a tubular casing portion forming a compression chamber, a plunger carried by one of said abutments and working in said casing, a passage leading from the compression chamber to a point below the limit of upward travel of one of said abutments, separate fuel and air intake valves for said chamber, intake and exhaust valves for said cylinder, a cam shaft for actuating the fuel valve of the head and also the intake valves, and another cam shaft for operating the air and exhaust valves.

10. A four cycle internal combustion engine including a cylinder having an orifice and a central transverse firing chamber, a pair of exhaust valves arranged at one side thereof and a pair of intake valves located at the other side thereof, separate cam shafts for operating the valves, a crank shaft, a main piston in the cylinder and operatively connected to the crank shaft, an auxiliary piston in the cylinder and also operatively connected with the crank shaft, said auxiliary piston being adapted to close said orifice on certain strokes of the cycle, a chambered cylinder head, a compressor plunger carried by the auxiliary piston and working in the chamber of the head, a fuel intake valve at one side of the chamber of the head and having a stem adapted to be actuated by a cam on the cam shaft for the intake valves, and an air intake valve on the other side of the head and also having a stem adapted to be engaged by a cam on the cam shafts for the exhaust valves.

11. A four cycle internal combustion engine including a cylinder, a chambered air and gas compressing head therefor, a crank shaft, main and auxiliary pistons connected to the crank shaft and working in opposition, opposite pairs of valves located at the upward limit of the stroke of the main piston, cam shafts for operating said valves, and opposite air and auxiliary gas valves having seats in the head of the cylinder and the lower ends of their stems engaged by said cams on cam shafts.

12. A four cycle internal combustion engine including a cylinder having a transverse firing chamber, puppet type intake and exhaust valves for said chamber, a main piston, an auxiliary piston, a plunger carried by the latter, a detachable head having a substantially T-shaped compression chamber the elongated part of which receives the said plunger while the wings are in valved communication with a source of fuel supply and the atmosphere, and means for establishing communication with said compression chamber and the working chamber of the cylinder.

13. A four cycle internal combustion engine including a cylinder having a compressor chamber at one end arranged to alternately communicate with a source of fuel supply and the atmosphere and a port in communication with said chamber, a work piston within said cylinder, and a plunger coöperating with said compressor chamber to alternately compress the gas and air contents of said chamber and uncover said port to release such compressed charge into the working chamber.

14. A four cycle internal combustion engine including a working cylinder formed with a valved compressor casing, a main piston within said working cylinder, a plunger coöperating with said compressor casing to compress alternately a supplemental fuel charge and a scavenging air charge, and means for admitting said compressed supplemental fuel charge to said working cylinder at the end of the main fuel suction stroke and for admitting said compressed scavenging air charge to said working cylinder at the end of the exhaust stroke of said main piston.

15. An internal combustion engine including in combination, a cylinder having a compressor chamber arranged to alternately communicate with the source of fuel suply and the atmosphere and a cylinder port communicating with said chamber, oppositely working pistons within the cylinder, and means whereby one of the pistons coöperates with said compressor chamber to alternately compress the gas and air contents thereof and uncover said port to release such compressed charge into the working chamber.

In testimony whereof I have hereunto set my hand.

JOB HUTCHINSON.